(12) United States Patent
Chauhan

(10) Patent No.: US 6,641,485 B1
(45) Date of Patent: Nov. 4, 2003

(54) SPACE RIDE SIMULATOR

(76) Inventor: Sanjay Chauhan, 209 SW. Miracle Strip Pkwy., Fort Walton Beach, FL (US) 32548

( * ) Notice: Subject to any disclaimer, the term of this patent is extended or adjusted under 35 U.S.C. 154(b) by 0 days.

(21) Appl. No.: 10/289,036

(22) Filed: Nov. 6, 2002

(51) Int. Cl.[7] .............................................. A63G 31/16
(52) U.S. Cl. ........................ 472/59; 472/130; 472/60; 434/34
(58) Field of Search ............................ 472/59, 60, 130, 472/68; 434/34, 55, 29

(56) References Cited

U.S. PATENT DOCUMENTS

| | | | | |
|---|---|---|---|---|
| 3,010,219 A | * | 11/1961 | Schueller .................... | 434/34 |
| 3,161,968 A | * | 12/1964 | De Boy et al. ............... | 434/34 |
| 3,468,533 A | * | 9/1969 | House, Jr. .................... | 472/60 |
| 3,534,485 A | * | 10/1970 | Simpson et al. .............. | 434/34 |
| 4,678,438 A | * | 7/1987 | Vykukal ....................... | 434/34 |
| 5,004,225 A | * | 4/1991 | Krukovsky ................... | 472/60 |
| 5,531,644 A | * | 7/1996 | Marumo ....................... | 472/68 |
| 5,848,899 A | * | 12/1998 | Howard ........................ | 434/34 |
| 5,950,543 A | * | 9/1999 | Oster ........................... | 104/138.1 |

* cited by examiner

Primary Examiner—Kien T. Nguyen
(74) Attorney, Agent, or Firm—Peter Loffler

(57) ABSTRACT

A space ride simulator allows a user to experience space travel 1, the weightlessness of being in space, and the reduced gravitational effects experienced while walking on a celestial body that is smaller than the earth. A 3-D simulator is used to create the various sights and sounds and movements of space travel, while a weightlessness room allows the user to experience weightlessness, and a weight reduced room allows a user to experience reduced gravitational effects while walking on a celestial body. The weightlessness room and the weight reduced room each have magnets embedded within the floor and a user dons a vest having a magnet thereattached, of the same polarity as the magnets within the floors. The magnets within the floors are of sufficient strength so as to completely or partially repel the user from the floor.

18 Claims, 3 Drawing Sheets

SPACE RIDE SIMULATOR

BACKGROUND OF THE INVENTION

1. Field of the Invention

The present invention relates to an amusement ride that simulates the various aspects of extraterrestrial travel including space travel, weightlessness, and the effects of reduced gravitational influence experienced while walking on an extraterrestrial body that is smaller than the earth and thus has less gravitational effect on the user relative to the gravitational effect of the earth.

2. Background of the Prior Art

It has been famously stated that space is the final frontier for humans. Since the beginning of recorded history, man has had a love affair with space. Man has written about space, man has studied space, and man has had a desire to travel into space in order to touch the stars. Relatively recently in man's history, we have had the ability to travel into space and return. We have landed people on the moon and we have sent a vehicle into space, had the vehicle return, and reused the vehicle for travel back into space over and over again. We have begun construction on a space station that will allow people from all over the earth to live and study in space. And very recently, we have had a man-made object launched from the earth, launched a long time back, leave the solar system.

However, with all of the mind-boggling developments that have taken place regarding space in less than half a century, actual space travel remains beyond the grasp of all but the very select few. Although more people than ever are traveling into space, the total numbers are still very tiny and leave millions wanting to travel.

Recently space tourists have been allowed to travel into on board Russian space vehicles, however, the multi-million dollar ticket paid by such tourists, reflecting the cost of space travel, is beyond the means of the vast majority of space enthusiasts yearning for the feeling of weightlessness. Additionally, such space tourists have had to undergo prolonged and demanding training prior to space launch.

In order to allow humans to experience the weightlessness experienced by space travelers without actually leaving the earth's atmosphere, a DC-10 is taken high up in the atmosphere and travels in a parabolic curve at a high rate of speed giving the passengers the feeling of zero gravity. The maneuver, performed on what is affectionately called the "Vomit Comet," is used by would-be astronauts during training for upcoming space travel, and has also been used by actors preparing for a space travel-based film. While a ride on the Vomit Comet will give a person a true feel of weightlessness, very few people have the financial ability to commandeer a DC-10 or similar jet to perform high speed high altitude maneuvers.

Therefore, there exists a need in the art for a device that allows a person of ordinary means to experience the thrills and excitement of space travel without the necessity of actually traveling through space, which is an extremely high cost undertaking. Such a device should allow a person to experience the sights and sounds of space travel, the weightlessness of space travel, and the effects of reduced gravitational pull experienced when walking on a celestial body that is smaller than the earth. Such a device must be extremely cost effective so that is can be enjoyed by the masses and must be very safe, reliable, and must not require extended training by the participants for proper use.

SUMMARY OF THE INVENTION

The space ride simulator of the present invention addresses the aforementioned needs. Specifically, the space ride simulator allows the average person to experience the thrills and excitement of space travel without the prohibitively high cost of actually traveling through space. The space ride simulator allows the user to experience the sights and sounds and movements of space travel, the weightlessness of space travel, and the effects of reduced gravitational pull experienced when walking on a celestial body that is smaller than the earth, such as the moon. The space ride simulator is extremely cost effective, when compared to actual space flight or even a ride on the Vomit Comet, so that is can be enjoyed by the masses and the simulator is very safe, very reliable, and does not require extended training by the participants for proper enjoyment.

The space ride simulator of the present invention is comprised of a virtual three dimensional simulator wherein a user on board the simulator experiences various extraterrestrial travel sights and sounds and movements. A weightlessness room is connected to the simulator wherein a first magnet of a given polarity is embedded within a first floor of the weightlessness room and a user of the weightlessness room dons a vest having a second magnet attached there, the second magnet being of the same polarity as the polarity of the first magnet such that the strength of the first magnet is sufficient to repel the user donning the vest from coming in contact with the first floor due to the magnetic repulsion of the first magnet and the second magnet. The simulator may be roller coaster based or may be a fixed 3-D simulator of appropriate design. The weightlessness room has various extraterrestrial sights and sounds contained therein and may have a maze, either horizontal in orientation, vertical in orientation, or some combination thereof. The weightlessness room may be padded or the user may be tethered to a ceiling of the weightlessness room while within the weightlessness room, or both. A weight reduced room is entered wherein a third magnet is embedded within a second floor of the weight reduced room, the third magnet being of the same polarity as the polarity of the first magnet and the second magnet, such that the strength of the third magnet is sufficient to reduce the gravitation interaction of the user donning the vest with respect to the second floor (the third magnet repels the user donning the second magnet-laden vest to a sufficient degree so that user contacts the floor of the weight reduced room with less frequency than can be experienced by a user subject to the standard gravitational pull of the earth). The weightlessness room, the weight reduced room, and the simulator are all interconnected such that a bridge connects the weight reduced room with the simulator. The weight reduced room has various extraterrestrial body sights and sounds contained therein. The weight reduced room may also be padded or the user may be tethered to a ceiling of the weight reduced room while within the weight reduced room or both.

BRIEF DESCRIPTION OF THE DRAWINGS

Similar reference numerals refer to similar parts throughout the several views of the drawings.

DESCRIPTION OF THE PREFERRED EMBODIMENT

Figure 1:
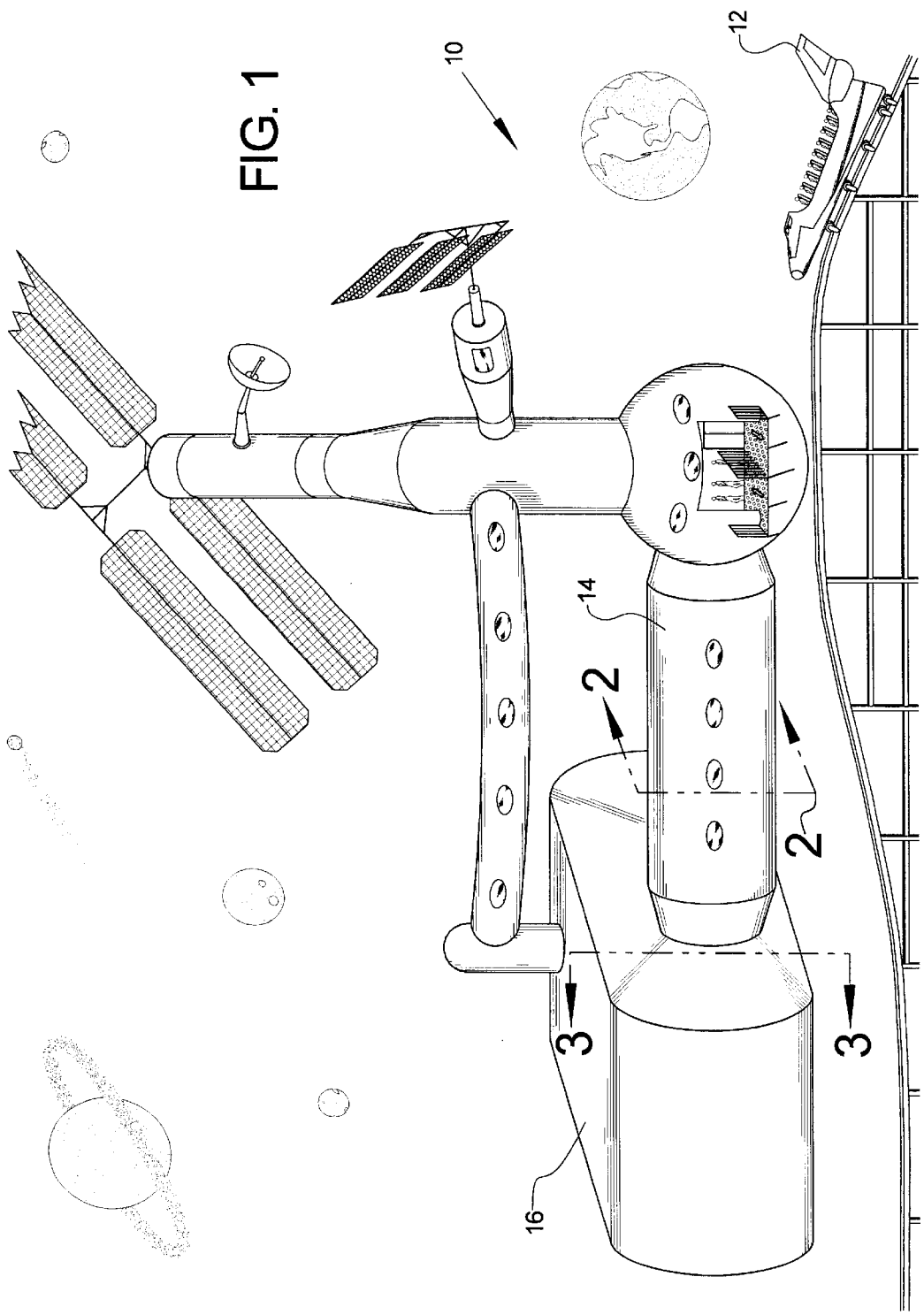
FIG. 1 is an environmental view of the space ride simulator of the present invention.
Figure 2:
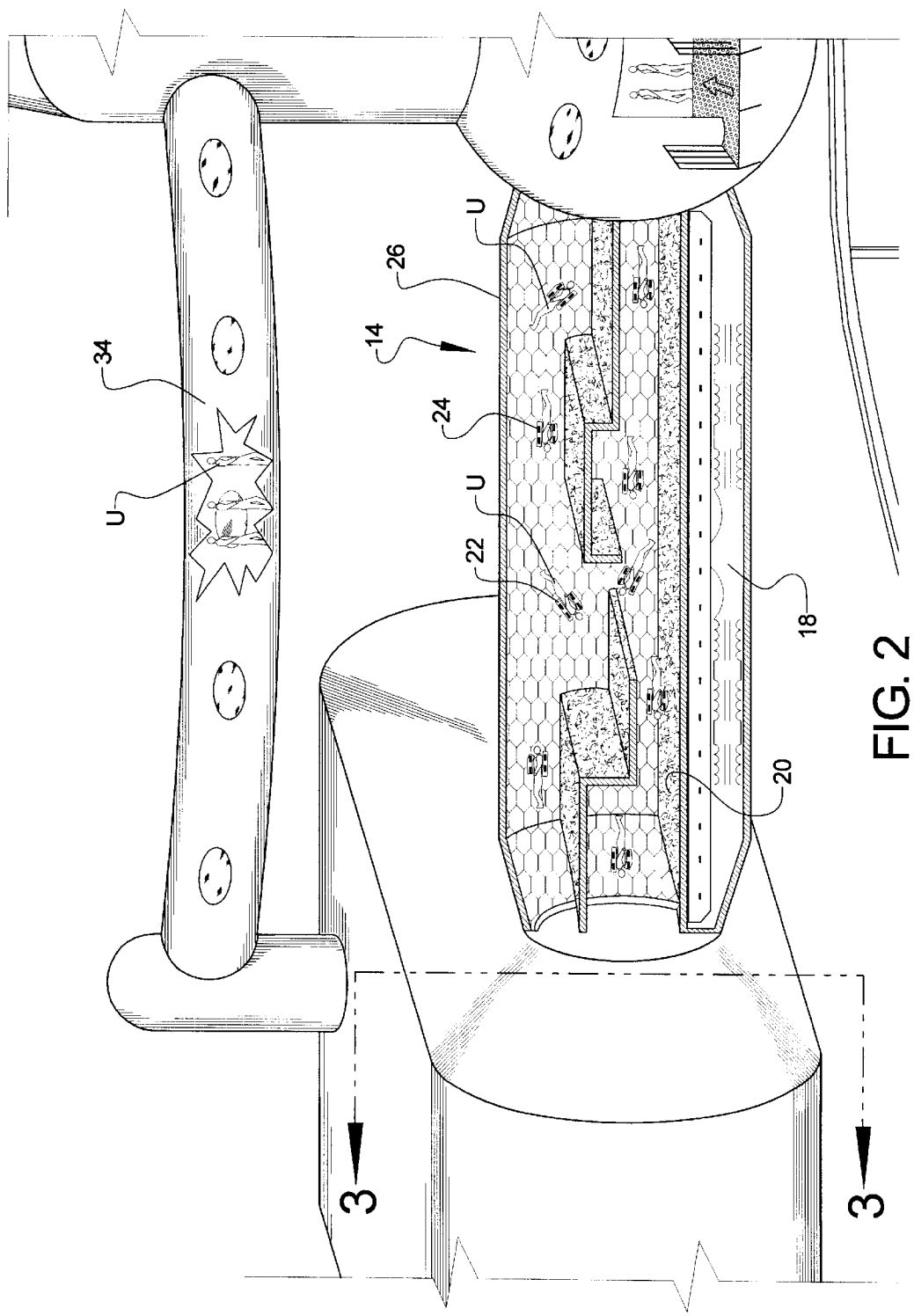
FIG. 2 is a perspective view, partially sectioned along line 2—2 in FIG. 1, detailing the weightlessness module of the space ride simulator of the present invention.
Figure 3:
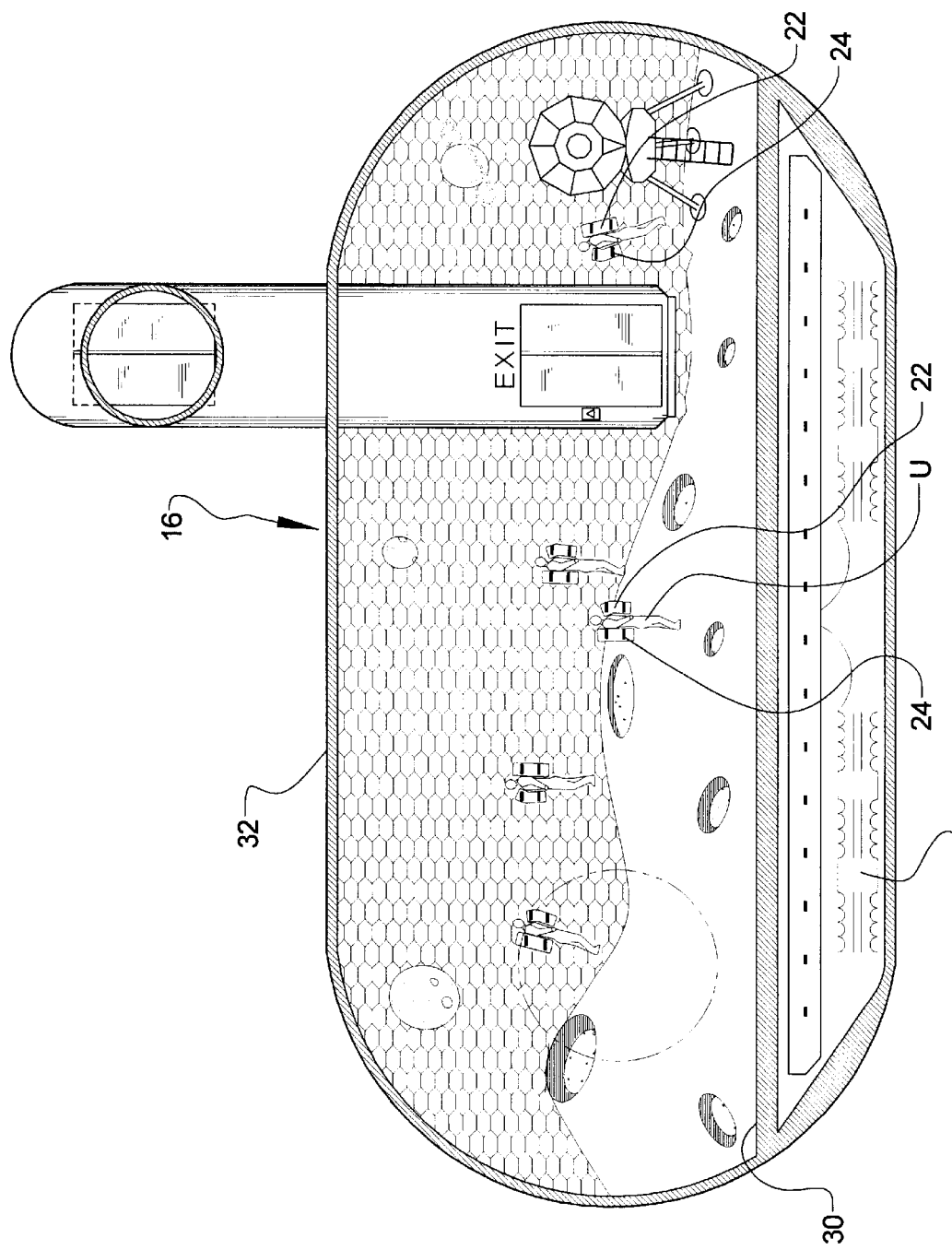
FIG. 3 is a perspective view, partially sectioned along line 3—3 in FIGS. 1 and 2, detailing the reduced gravitational effect module of the space ride simulator of the present invention.

Referring now to the drawings, it is seen that the space ride simulator of the present invention, generally denoted by reference numeral 10, is comprised of three distinct modules, the virtual three dimensional simulator 12, wherein a user experiences the various sights and sounds and movements of general space travel, the weightlessness room 14, wherein the user experiences the weightlessness of space travel, and the weight reduced room 16 wherein the user experiences the reduced gravitational pull experienced by a user on a celestial body that is smaller than the earth, such as the moon.

The simulator 12 can be one of two standard configurations, including the illustrated roller coaster based configuration wherein the simulator is a roller coaster ride and the user on board the simulator is subject to various space travel sights and sounds, such as passing meteors and planets, increased speed through worm holes, etc. Advantageously, such a configuration is undertaken in relative darkness for added effect and realism. Alternately, the simulator can be a 3-D simulator of standard design wherein a user boards the simulator 12 and the user is presented with a visual display and hydraulic controls move the simulator in lockstep with the display in order to give the user a sensation of space travel. In either configuration, the specific sights and sounds presented to the user are design specific and are left to the creativity and imagination of the ride's designers.

The weightlessness room 14, which has a variety of space related sights and sounds, and which may have a maze that is horizontally disposed, vertically disposed, or some combination thereof, has a first magnet 18 of a given polarity embedded within its floor 20. A user U of the weightlessness room 14 dons a vest 22 having a second magnet 24 attached thereto such that the second magnet 24 is of the same polarity as the polarity of the first magnet 18. The strength of the first magnet 18 is sufficient to repel the user U donning the vest 22 (having a second magnet of the same polarity as the first magnet 18) from coming in contact with the floor 20 of the weightlessness room 14. Advantageously, the first magnet 18 is an electromagnet while the second magnet 24, located on the vest worn by the user U, can be a permanent magnet, including a rare earth permanent magnet or may also be an electromagnet.

In either configuration, the magnetic force of the second magnet 24 is sized so as to allow a user of a given weight to be able to don the vest 22 and enter the weightlessness room 14 such that the magnetic force of the first magnet 18 is sufficient to repel the user U wearing the vest 22. If the second magnet is a permanent magnet, the vest 22 is chosen based on the weight of the user U so as to have a second magnet 24 of sufficient strength in order to accomplish the desired goal. If the second magnet 24 is an electromagnet, a control switch (not illustrated) on the vest 22 can be provided to select the desired strength of the second magnet 24 based on the user's weight in order to achieve the desired goal.

For protection of the user, the weightlessness room 14 and the various fixtures located therein may be padded or the user U may be tethered to the ceiling 26 such that if a power failure occurs in the first magnet 18 or if the second magnet 24 is an electromagnet and it fails, the potential for injury to the user U as the user falls to the floor 20 is minimized.

In similar fashion, the weight reduced room 16 has a third magnet 28 of the same polarity as the polarity of the first magnet 18 and the second magnet 24 that is embedded within its floor 30, the magnetic strength of the third magnet 28 being less than the magnetic strength of the first magnet 18. The user U of the weight reduced room 16 maintains the donned vest 22 while entering the weight reduced room 16 and as the strength of the third magnet 28 is sufficient to partially repel the user U donning the vest 22 from coming in contact with the floor 30 of the weight reduced room 16, the user U experiences the effects of walking on a celestial body that is smaller than the earth. Advantageously, the third magnet 28 is an electromagnet. The weight reduced room 16 has a variety of celestial body related sights and sounds therein for enhanced effect upon the user U experiencing the room 16.

Also for protection of the user, the weight reduced room 16 and the various fixtures located therein, may be padded or the user U may be tethered to the ceiling 32 such that if a power failure occurs in the third magnet 28, or if the second magnet 24 is an electromagnet and it fails, the potential for injury to the user U is minimized.

The space ride simulator 10 may be configured in any desired fashion, such as illustrated wherein the simulator 12 exits at the entrance of the weightlessness room 14 and the weightlessness room 14 exits at the entrance of the weight reduced room 16 so that a user U rides the simulator 12, exits the simulator 12, enters the weightlessness room 14 and rides within the weightlessness room 14, and thereafter exits the weightlessness room 14 and enters the weight reduced room 16, rides the weight reduced room 16, and thereafter exits the weight reduced room 16, either exiting the ride 10 altogether, or taking a bridge 34 back to the simulator 12 for additional riding on the simulator, if a roller coaster based simulator is used, for the "flight" back home. Any combination and configuration of the three modules 12, 14, and 16, is possible, the above being provided as a mere example of a typical space flight wherein a user U travels through space (simulator 12), experiences weightlessness (weightlessness room 14) and walks on a celestial body (weight reduced room 16) wherein the gravitational effects of the celestial body are less than the gravitational effects experienced on the earth.

In order to use the space ride simulator 10 of the present invention, the user rides the simulator 12 and thereafter exist the simulator 12 and is given a vest 22 of the appropriate size relative to the user's weight. The user U dons the vest 22 (the user U may be given the vest 22 and may also don the vest 22 prior to entering the simulator 12 portion of the ride) and enters either the weightlessness room 14 or the weight reduced room 16, depending on the particular configuration of the ride and the user U continues through the ride 10 in appropriate fashion entering other modules as appropriate. In any configuration, each module will have an appropriate exit in order to allow a rider U to exit the ride 10 if desired.

The exterior facade of the space rider simulator 10 may also have a space travel appropriate configuration.

While the invention has been particularly shown and described with reference to an embodiment thereof, it will be appreciated by those skilled in the art that various changes in form and detail may be made without departing from the spirit and scope of the invention.

I claim:

1. An amusement ride comprising:

a virtual three dimensional simulator wherein a user on board the simulator experiences various extraterrestrial travel sights and sounds;

a weightlessness room wherein a first magnet of a given polarity is embedded within a first floor of the weightlessness room;

a vest having a second magnet attached thereto, the second magnet is of the same polarity as the polarity of the first magnet, a user of the weightlessness room dons the vest such that the strength of the first magnet is sufficient to repel the user donning the vest from coming in contact with the first floor; and wherein the simulator and the weightlessness room are connected.

2. The amusement ride as in claim 1 wherein the simulator is roller coaster based.

3. The amusement ride as in claim 1 wherein the weightlessness room has various extraterrestrial sights and sounds contained therein.

4. The amusement ride as in claim 1 wherein the weightlessness room is padded.

5. The amusement ride as in claim 1 wherein the user is tethered to a ceiling of the weightlessness room while within the weightlessness room.

6. The amusement ride as in claim 1 further comprising:

a weight reduced room wherein a third magnet is embedded within a second floor of the weight reduced room, the third magnet being of the same polarity as the polarity of the first magnet, such that the strength of the third magnet is sufficient to reduce the gravitation interaction of the user donning the vest with respect to the second floor.

7. The amusement ride as in claim 6 wherein the weight weightlessness room, the weight reduced room, and the simulator are all interconnected.

8. The amusement ride as in claim 6 wherein the simulator is connected to the weightlessness room, the weightlessness room is connected to the weight reduced room, and a bridge connects the weight reduced room with the simulator.

9. The amusement ride as in claim 6 wherein the weight reduced room has various extraterrestrial body sights and sounds contained therein.

10. The amusement ride as in claim 6 wherein the weight reduced room is padded.

11. The amusement ride as in claim 6 wherein the user is tethered to a ceiling of the weight reduced room while within the weight reduced room.

12. An amusement ride comprising:

a weightlessness room wherein a first magnet of a given polarity is embedded within a first floor of the weightlessness room;

a vest having a second magnet attached there, the second magnet is of the same polarity as the polarity of the first magnet such that a user of the weightlessness room dons the vest such that the strength of the first magnet is sufficient to repel the user donning the vest from coming in contact with the first floor;

a weight reduced room wherein a third magnet is embedded within a second floor of the weight reduced room, the third magnet being of the same polarity as the polarity of the first magnet, such that the strength of the third magnet is sufficient to reduce the gravitation interaction of the user donning the vest with respect to the second floor; and wherein the weightlessness room and the weight reduced are connected.

13. The amusement ride as in claim 12 wherein the weightlessness room has various extraterrestrial sights and sounds contained therein.

14. The amusement ride as in claim 12 wherein the weight reduced room has various extraterrestrial body sights and sounds contained therein.

15. The amusement ride as in claim 12 wherein the weightlessness room is padded.

16. The amusement ride as in claim 15 wherein the weight reduced room is padded.

17. The amusement ride as in claim 12 wherein the user is tethered to a ceiling of the weightlessness room while within the weightlessness room.

18. The amusement ride as in claim 17 wherein the user is tethered to a ceiling of the weight reduced room while within the weight reduced room.

* * * * *